(12) United States Patent
Moroney

(10) Patent No.: US 8,412,066 B2
(45) Date of Patent: Apr. 2, 2013

(54) TEST IMAGE PRINT VARIATIONS FOR PRINT QUALITY ANALYSIS

(75) Inventor: Brian W. Moroney, Longmont, CO (US)

(73) Assignee: Ricoh Production Print Solutions LLC, Boulder, CO (US)

(*) Notice: Subject to any disclaimer, the term of this patent is extended or adjusted under 35 U.S.C. 154(b) by 214 days.

(21) Appl. No.: 12/827,859

(22) Filed: Jun. 30, 2010

(65) Prior Publication Data

US 2012/0002994 A1    Jan. 5, 2012

(51) Int. Cl.
   *G03G 15/20* (2006.01)
(52) U.S. Cl. ................. 399/72; 399/15; 399/49
(58) Field of Classification Search ............ 399/72, 399/15, 49
   See application file for complete search history.

(56) References Cited

U.S. PATENT DOCUMENTS

| | | | |
|---|---|---|---|
| 6,894,713 B2 | 5/2005 | Moulin et al. | |
| 7,283,282 B2 | 10/2007 | Sanger et al. | |
| 7,319,547 B2 | 1/2008 | Piatt | |
| 2004/0021879 A1 | 2/2004 | Castelltort et al. | |
| 2006/0039707 A1* | 2/2006 | Mima | 399/23 |
| 2006/0152776 A1* | 7/2006 | Bailey | 358/504 |
| 2007/0242962 A1* | 10/2007 | Yamamoto | 399/15 |
| 2008/0111847 A1 | 5/2008 | Kojima | |
| 2008/0130037 A1 | 6/2008 | Tamayo et al. | |

* cited by examiner

*Primary Examiner* — Walter L Lindsay, Jr.
*Assistant Examiner* — Roy Y Yi
(74) *Attorney, Agent, or Firm* — Duft Bornsen & Fettig, LLP

(57) ABSTRACT

Methods and systems herein provide for printing a plurality of variations of a test image utilizing different values of a print quality parameter for print quality analysis of a printer. A print quality parameter is selected that modifies a print quality of the printer when printing a test image. A range of values for the print quality parameter is defined to utilize when printing the test image. A plurality of variations of the test image are printed based on the range of values defined for the print quality parameter, which allows for an analysis of the print quality of the printer by the user.

15 Claims, 8 Drawing Sheets

TEST IMAGE PRINT VARIATIONS FOR PRINT QUALITY ANALYSIS

FIELD OF THE INVENTION

The invention relates to the field of printing systems and, in particular, for printing a plurality of test images utilizing different values of a print quality parameter for print quality analysis.

BACKGROUND

Optimizing the print quality of a production printing system may entail a number of iterative processes before the print quality is deemed "acceptable" by an operator. For example, an operator may make an adjustment, print an output, analyze the printed output, and repeat until the output is deemed acceptable. More problematic is when the production printing system utilizes continuous form media. Production printing systems utilizing continuous form media typically include a large linear media path from the output of the print engine to a location where the operator may observe the printed result. Thus, a significant amount of paper may be wasted each time the adjustment process is performed by the operator. Therefore, it remains a problem to efficiently and quickly perform print quality analysis on a printing system.

SUMMARY

Embodiments described herein provide systems and methods for printing a plurality of variations of a test image utilizing different values of a print quality parameter for print quality analysis of a printer. A print quality parameter is selected that modifies a print quality of the printer when printing a test image. A range of values for the print quality parameter is defined to utilize when printing the test image. A plurality of variations of the test image are printed based on the range of values defined for the print quality parameter, which allows for an analysis of the print quality of the printer by the user.

In one embodiment, a printer comprising a user interface and a print module is disclosed. The user interface is operable to receive input from a user selecting a print quality parameter that modifies a print quality of the printer when printing a test image, and to receive input from the user defining a range of values for the print quality parameter to utilize when printing the test image. The print module is operable to print a plurality of variations of the test image based on the range of values defined for the print quality parameter, where each of the variations of the test image is printed utilizing a different value in the range defined for the print quality parameter to allow for an analysis of the print quality of the printer by the user.

In another embodiment, a method operable on a printer is disclosed. According to the method, a print quality parameter is selected that modifies a print quality of the printer when printing the test image. A range of values for the print quality parameter are defined to utilize when printing the test image. A plurality of variations of the test image are printed based on the ranges of values defined for the print quality parameter, where each of the variations of the tests image is printed utilizing a different value in the defined range of the print quality parameter to allow for an analysis of the print quality of the printer by the user.

Other exemplary embodiments may be described below.

DESCRIPTION OF THE DRAWINGS

Some embodiments of the present invention are now described, by way of example only, and with reference to the accompanying drawings. The same reference number represents the same element or the same type of element on all drawings.

DESCRIPTION OF THE EMBODIMENTS

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
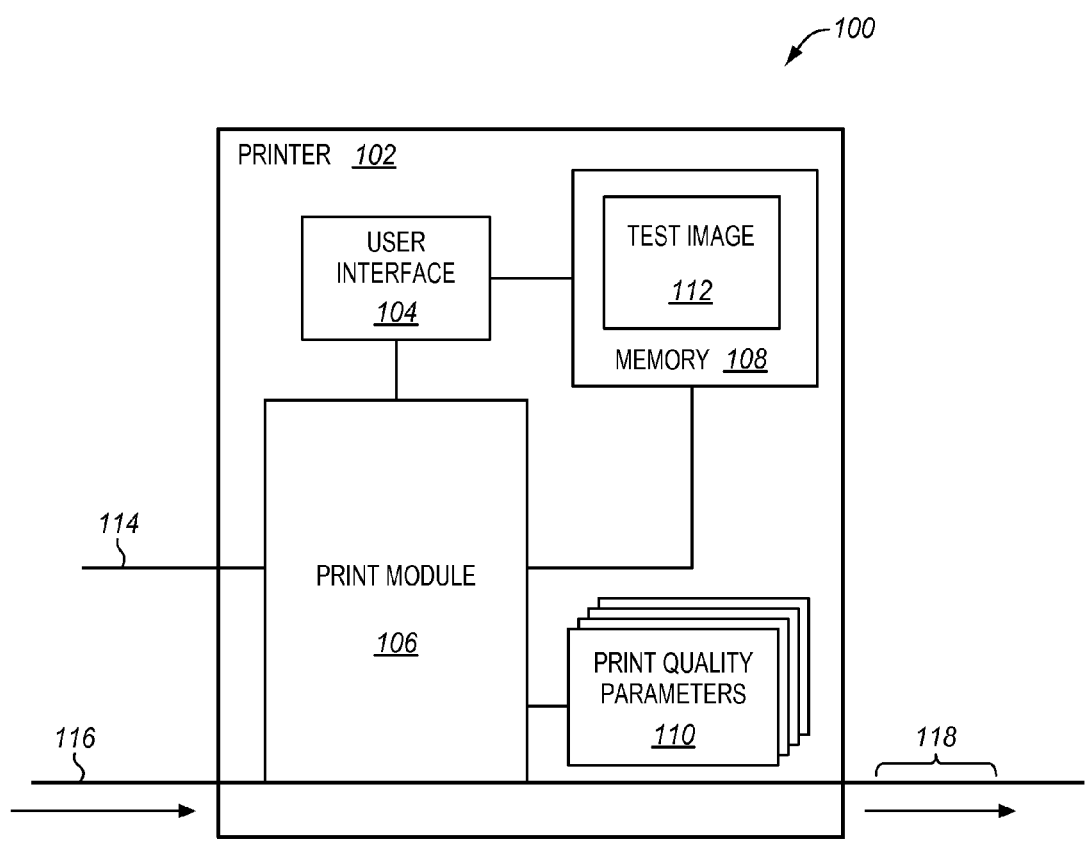
FIG. 1 is a block diagram illustrating a printing system for printing a plurality of test image variations to allow for the print quality analysis of a printer in an exemplary embodiment.

FIG. 1 is a block diagram illustrating a printing system 100 for printing a plurality of test image variations to allow for the print quality analysis of a printer 102 in an exemplary embodiment. Media 116 is fed through printer 102 in the direction indicated by the arrow for imprinting by printer 102. Printer 102 includes a test image 112 stored within a memory 108 and print quality parameters 110. In printer 102, print quality parameters 110 modify the print quality of printer 102. For example, print quality parameters 110 may modify how test image 112 is rasterized when printing test image 112 on printer 102. Further, print quality parameters 110 may modify a physical parameter of a print engine (not shown) within a print module 106 when printing test image 112 on printer 102. Thus, printing a plurality of test image variations, each utilizing different values for print quality parameters 110 when printing test image 112, may allow a user to determine how the print quality of printer 102 is modified based on changes to the value of print quality parameters 110. A user may, for example, inspect a section 118 of media 116 after printing the test image variations to allow for an analysis of the print quality of printer 102. Print module 106 comprises any device, component, or system operable to print onto media 116. Print module 106 may receive print data 114 from a host (not shown) for printing onto media 116. Printer 102 also includes a user interface 104. User interface 104 comprises any device, component, or system operable to receive input from a user to control the operation of printer 102.

Controlling the operation of printer 102 may include modifying the value of one or more of print quality parameters 110 when rasterizing and/or printing test image 112.

Figure 2:
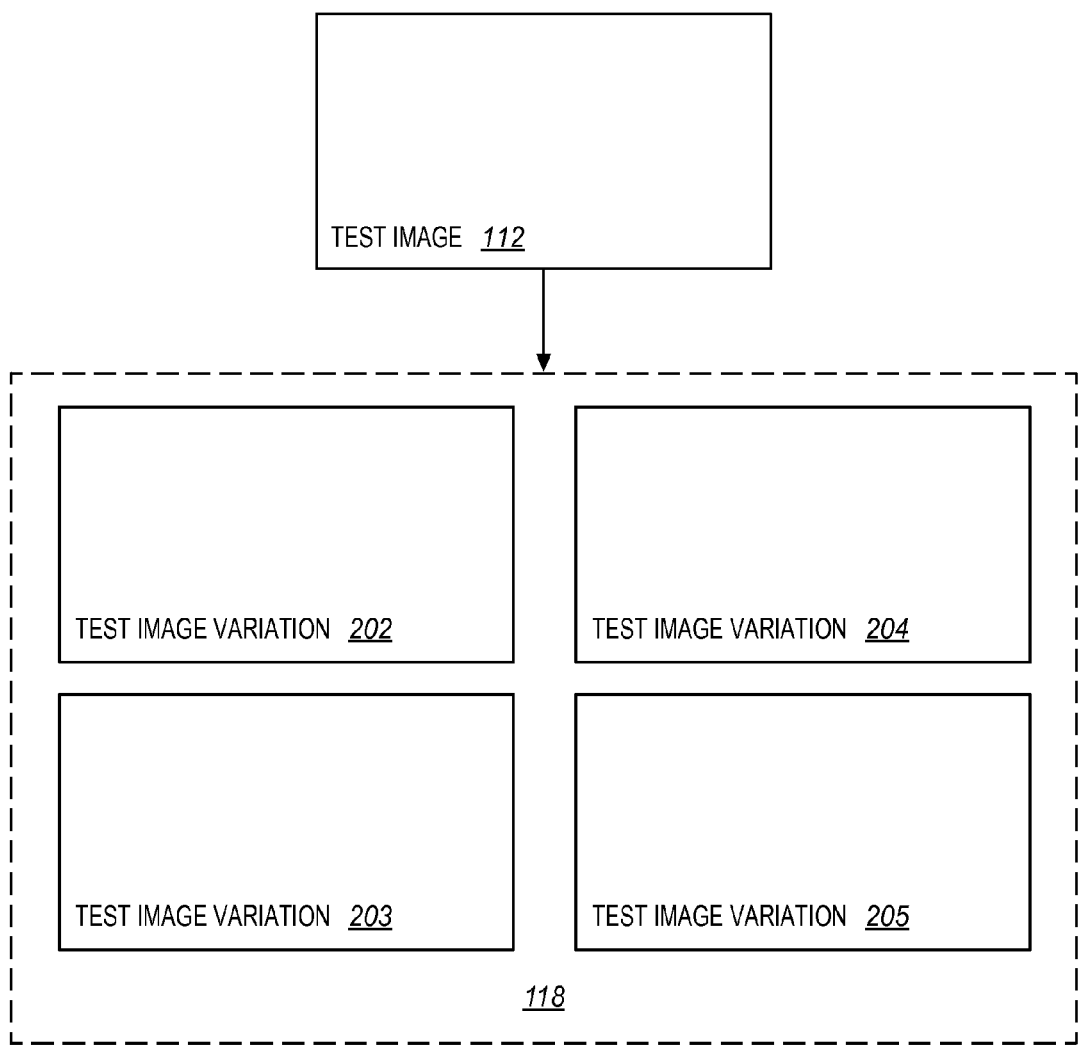
FIG. 2 illustrates a test image and a plurality of test image variations in an exemplary embodiment.

FIG. 2 illustrates an example of section 118 of media 116 which includes a number of test image variations 202-205 printed from test image 112 by printer 102, where each of the test image variations 202-205 may be printed utilizing a different value for one or more of print quality parameters 110. Section 118 illustrates a 4-up layout for test image variations 202-205 printed from test image 112 by printer 102, although other layouts may exist.

Figure 3:
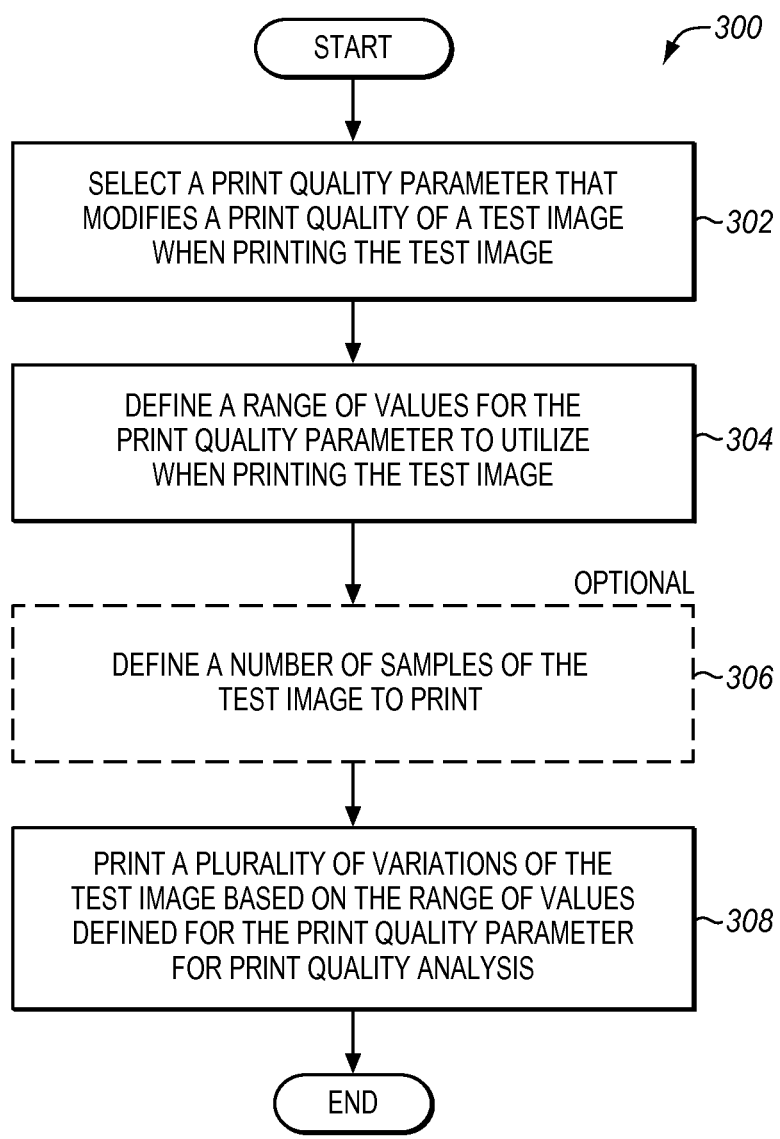
FIG. 3 is a flow chart illustrating a method of printing a plurality of test image variations to allow for the print quality analysis of a printer in an exemplary embodiment.

FIG. 3 is a flow chart illustrating a method 300 of for printing a plurality of test image variations 202-205 to allow for the print quality analysis of printer 102 in an exemplary embodiment. The steps of method 300 will be described with respect to system 100 of FIG. 1, although one skilled in the art will recognize that method 300 may be performed by other systems not shown. In addition, the steps of the flow charts shown herein are not all inclusive and other steps, not shown, maybe included. Further, the steps may be performed in an alternate order.

In step 302, user interface 104 (see FIG. 1) receives input for selecting one or more of print quality parameters 110 that modify a print quality of printer 102 when printing test image 112. For example, some print quality parameters 110 may modify how test image 112 is rasterized before printing test image 112. Examples include modifying or selecting various pels, screens, tone curves, colorant levels, halftone curves, highlight and/or midtone shadows, brightness, dot gain, etc., when rasterizing test image 112. In like manner, some print quality parameters 110 may modify the physical parameters of a print engine (not shown) of print module 106 when printing test image 112. Examples include modifying or selecting a contrast, a boldness, a preheat temperature, a fuser temperature, an oil rate, an oil belt rate, etc., when printing test image 112.

In step 304, user interface 104 receives input defining a range of values for print quality parameters 110 selected in step 302. A user may, for example, define a lower limit and an upper limit for each of print quality parameters 110 to define the range. Also, the user may define a median value for print quality parameters 110 and a +/− variation to define the range.

In step 306, which is an optional step for method 300, user interface 104 may receive input defining a number of samples of test image 112 to print within the range of values defined in step 304. For example, the user may elect to print ten samples of test image 112 within the range. The samples may be evenly distributed within the range or may be distributed within the range in some other manner, such as a non-linear distribution within the range. A non-linear distribution of samples within the range may be advantageous when the print quality for printer 102 varies in a non-linear manner for the one or more print quality parameters 110 selected in step 302.

In step 308, print module 106 prints a plurality of test image variations 202-205 based on the range defined in step 304 to allow the user to analyze the print quality of printer 102. Test image 112 may be pre-programmed into printer 102 for printing and/or may be received within print data 114 (e.g., within a print job received by printer 102). Referring again to FIG. 2, a number of test image variations 202-205 are printed by print module 106 for analysis by the user. A user may, for example, visually observe section 118 of media 116 after printing to determine which, if any, of test image variations 202-205 are acceptable with regards to print quality. When the optional step 306 is performed as discussed previously, the number of test image variations 202-205 printed by print module 106 for analysis may comprise the number of samples defined by the user. Because multiple test image variations 202-205 are printed based on a range of values defined for print quality parameters 110, a user may quickly and efficiently observer an output from printer 102 as shown in section 118 for print quality analysis. After performing method 300, the user may adjust print quality parameters 110 for subsequently printing print jobs on printer 102. For example, the user may first identify one of the test image variations 202-205 corresponding with one of the values in the range defined for print quality parameters 110. Each of the test image variations 202-205 may include information identifying one of the values in the range defined for print quality parameters 110 to allow the user to quickly relate the values with each of the test image variations 202-205. After the identification, the user may then adjust print quality parameters 110 for printer 102 corresponding to the identified one of the test image variations 202-205, and then utilize the adjusted print quality parameters 110 for subsequently printing a print job. Adjusting print quality parameters 110 improves the print quality for printer 102 when subsequently printing the print job. One skilled in the art will recognize that multiple print quality parameters 110 may be selected by the user in step 302, thereby allowing for multiple combinations of print quality parameters 110 to be evaluated for print quality analysis within a single printed output. For example, a user may choose to print a 10×10 matrix of variations of test image 112, where each row of the output represents ten samples of a different range of one of print quality parameters 110. This advantageously allows the user to quickly and efficiently analyze the print quality of printer 102.

Figure 4:
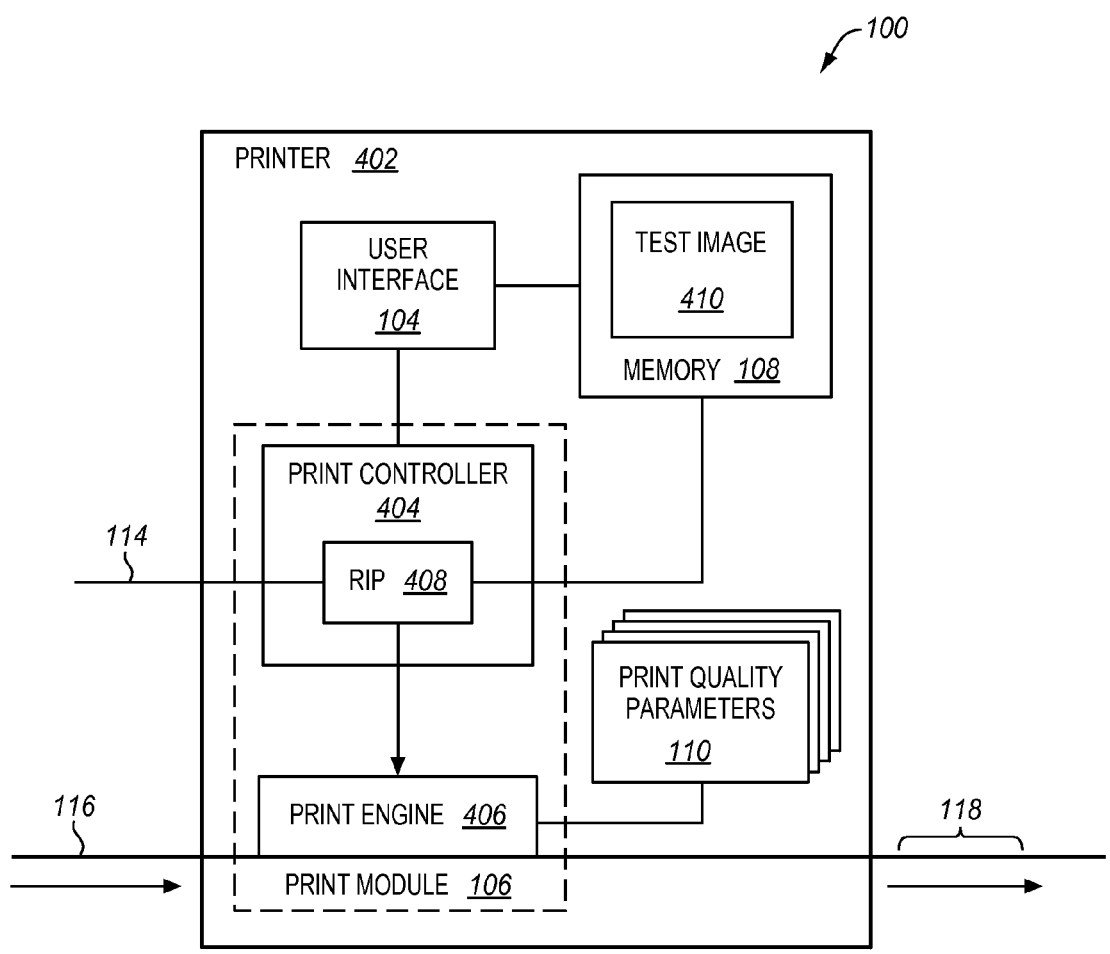
FIG. 4 is a block diagram illustrating a printing system printer for printing a plurality of test image variations to allow for the print quality analysis of another printer in an exemplary embodiment.

FIG. 4 is a block diagram illustrating printing system 100 for printing a plurality of test image variations to allow for the print quality analysis of another printer 402 in an exemplary embodiment. Media 116 is fed through printer 402 in the direction indicated by the arrow for imprinting by printer 402. Printer 402 includes a test image 410 stored within memory 108 and print quality parameters 110. Printer 402 also includes user interface 104. In FIG. 4, print module 106 of printer 402 additionally includes a print controller 404 and a print engine 406. Print controller 404 comprises any component, system, or device operable to rasterize test image 410 into a plurality of rasterized versions of test image 410, and to direct print engine 406 to print the rasterized versions of test image 410 as a plurality of variations of test image 410 to allow for the analysis of the print quality of printer 402 by the user. More specifically, a Raster Image Processor (RIP) 408 receives print data 114 (e.g., from a host, not shown) and test image 412 from memory 108, and generates bitmap data. RIP 408 may then forward the bitmap data to print engine 406 for printing. System 100 allows a user to interact with printer 402 utilizing user interface 104 to print a plurality of variations of test image 410 onto media 116 for print quality analysis of printer 402 by the user.

Figure 5:
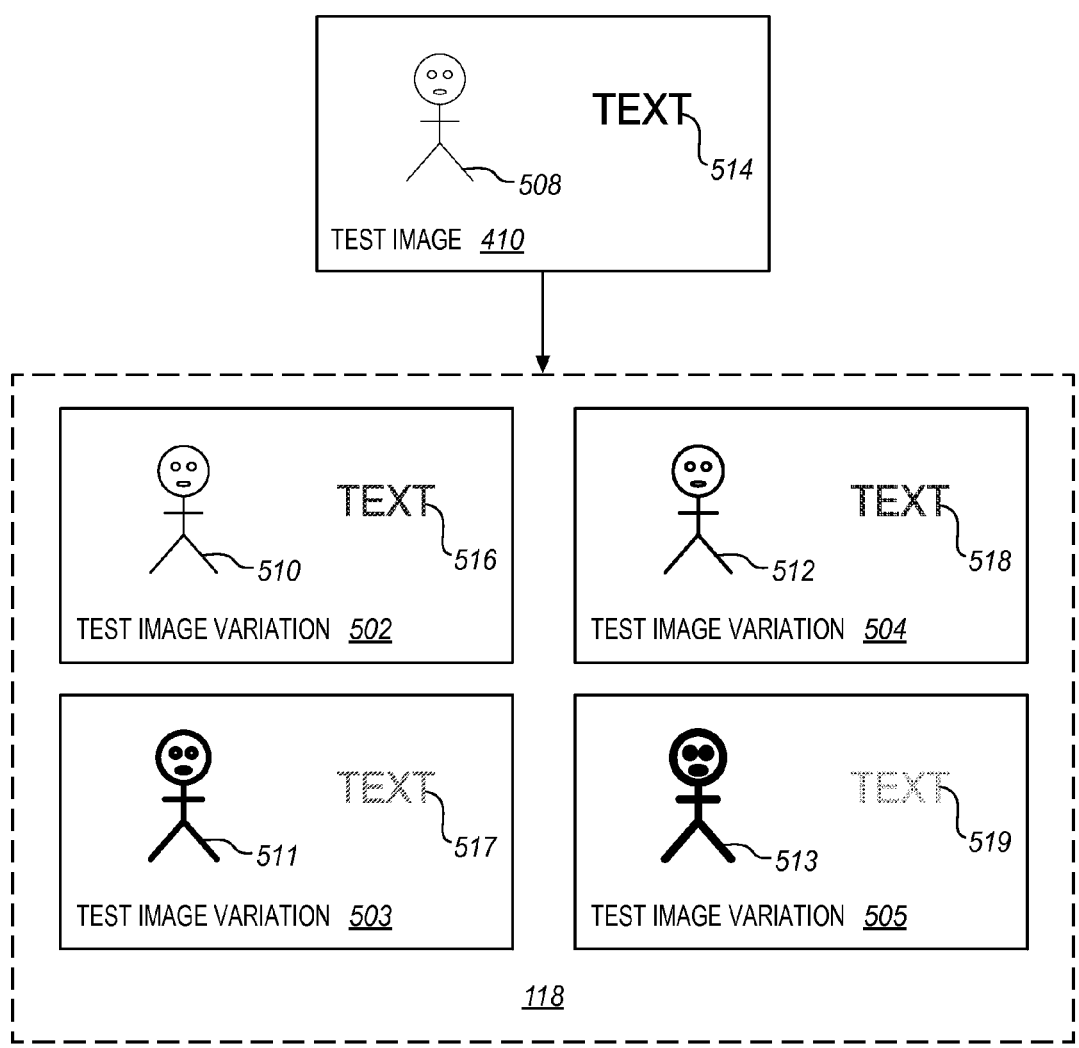
FIG. 5 illustrates another test image and another plurality of test image variations in an exemplary embodiment.

FIG. 5 illustrates another test image 410 and another plurality of test image variations 502-505 in an exemplary embodiment. In FIG. 5, test image 410 is illustrated with a graphics component 508 and a text component 514 for subsequent print quality analysis. One skilled in the art will recognize that test image 410 may comprise any combination of graphics components 508 and text components 514 to allow the user to evaluate the print quality of printer 402 after printing the plurality of test image variations 502-505 on printer 402.

Figure 6:
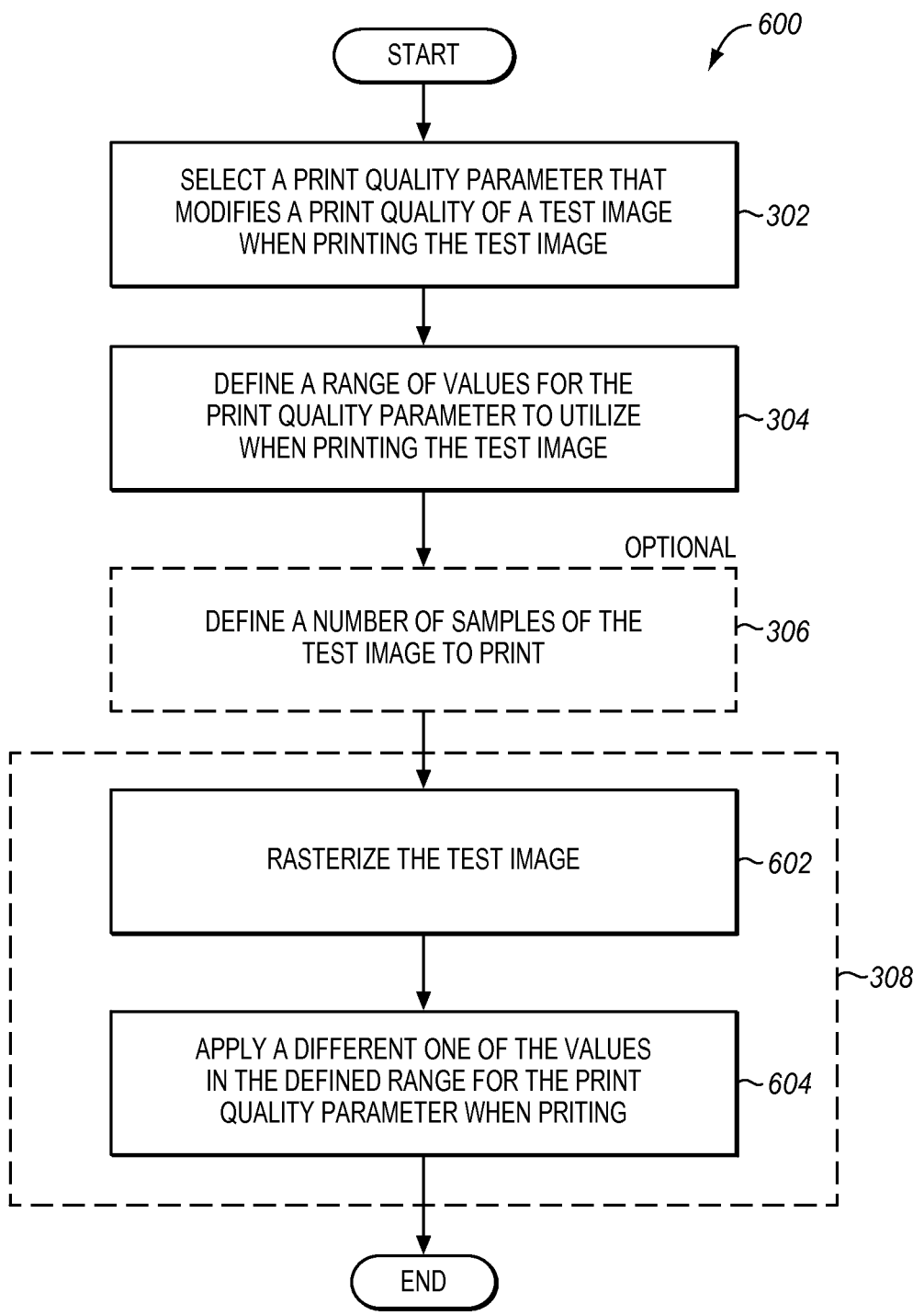
FIGS. 6-7 are flow charts illustrating methods of printing a plurality of test image variations to allow for the print quality analysis of a printer in an exemplary embodiment.
Figure 7:
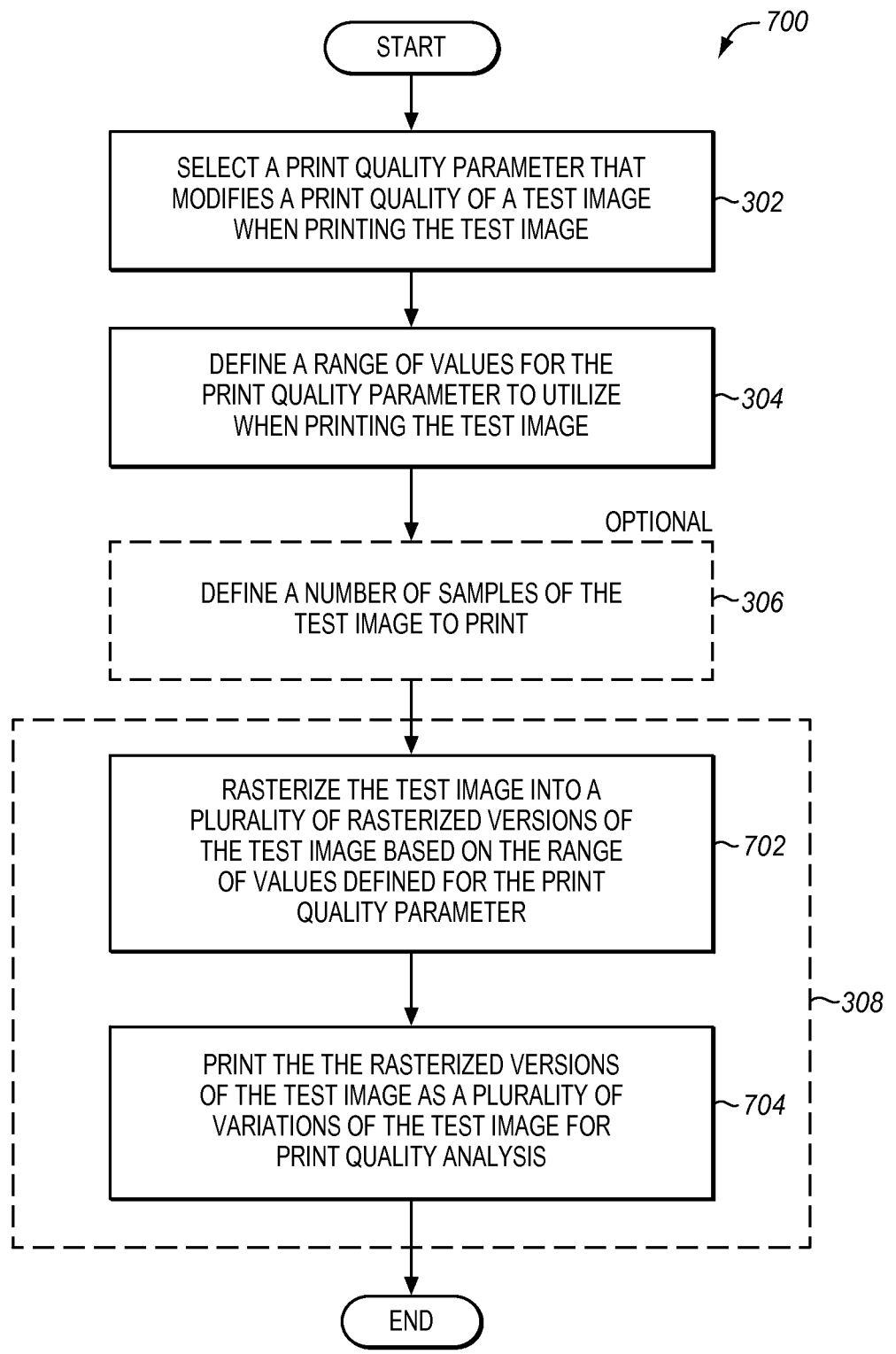

FIGS. 6-7 are flow charts illustrating methods 600 and 700 of printing a plurality of test image variations 502-505 to allow for the print quality analysis of printer 402 in an exemplary embodiment. In method 600, a test image is rasterized.

A different one of the values of in a defined range for a print quality parameter is applied when printing the rasterized test image. In method 700, the test image is rasterized into a plurality of rasterized versions of the test image based on the range of values defined for the print quality parameter. Further, each of the rasterized versions of the test image is rasterized utilizing a different value in the range defined for the print quality parameter. Each of the rasterized versions is then printed. The steps of methods 600 and 700 will be described with respect to system 100 of FIG. 4, although one skilled in the art will recognize that methods 600 and 700 may be performed by other systems not shown.

In step 302 of method 600, user interface 104 receives input selecting one or more of print quality parameters 110 that modify a print quality of printer 402 when printing test image 410. In step 304 of method 600, user interface 104 receives input defining a range of values for print quality parameters 110 selected in step 302. In step 306 of method 600, which is an optional step for method 600, user interface 104 may receive input defining a number of samples of test image 410 to print within the range of values defined in step 304.

In step 602 of method 600, RIP 408 rasterizes test image 410 and provides the rasterized test image 410 to print engine 406. In step 604, print engine 406 prints the rasterized test image 410 as a plurality of test image variations 502-505 based on the range of values defined for print quality parameters 110 defined in step 304. Further, each of test image variations 502-505 are printed by print engine 408 by applying a different one of the values in the defined range for print quality parameters 110 defined in step 304. For example, a contrast, a boldness, a preheat temperature, a fuser temperature, an oil rate, an oil belt rate, etc., of print engine 408 may be modified when printing each of the test image variations 502-505. A user may then observe test image variations 502-505 to determine how the print quality of printer 402 changes based on changes to print engine 406. For example, the user may first identify one of the test image variations 502-505 corresponding with one of the values in the range defined for print quality parameters 110. Each of the test image variations 502-505 may include information identifying one of the values in the range defined for print quality parameters 110 to allow the user to quickly relate the values with each of the test image variations 502-505. After the identification, the user may then adjust print quality parameters 110 for printer 402 corresponding to the identified one of the test image variations 502-505, and then utilize the adjusted print quality parameters 110 for subsequently printing a print job.

Referring to FIG. 7, steps 302-306 have been discussed with regards to method 600 of FIG. 6 and will not be reiterated here. In step 702, RIP 408 of print controller 404 rasterizes test image 410 into a plurality of rasterized versions of test image 410 based on the range of values defined for the one or more print quality parameters 110 in step 304. In step 702 each of the rasterized versions of test image 410 are rasterized by RIP 408 utilizing a different value of print quality parameters 110 within the range. For example, various pels, screens, tone curves, colorant levels, halftone curves, highlight and/or midtone shadows, brightness, dot gain etc., may be modified when rasterizing test image 410.

In step 704, print engine 406 prints the rasterized versions of test image 410 to generate test image variations 502-505 shown in FIG. 5. A user may then observe test image variations 502-505 to determine how the print quality of printer 402 changes based on changes to RIP 408. For example, the user may first identify one of the test image variations 502-505 corresponding with one of the values in the range defined for print quality parameters 110. Each of the test image variations 502-505 may include information identifying one of the values in the range defined for print quality parameters 110 to allow the user to quickly relate the values with each of the test image variations 502-505. After the identification, the user may then adjust print quality parameters 110 for printer 402 corresponding to the identified one of the test image variations 502-505, and then utilize the adjusted print quality parameters 110 for subsequently printing a print job.

Figure 8:
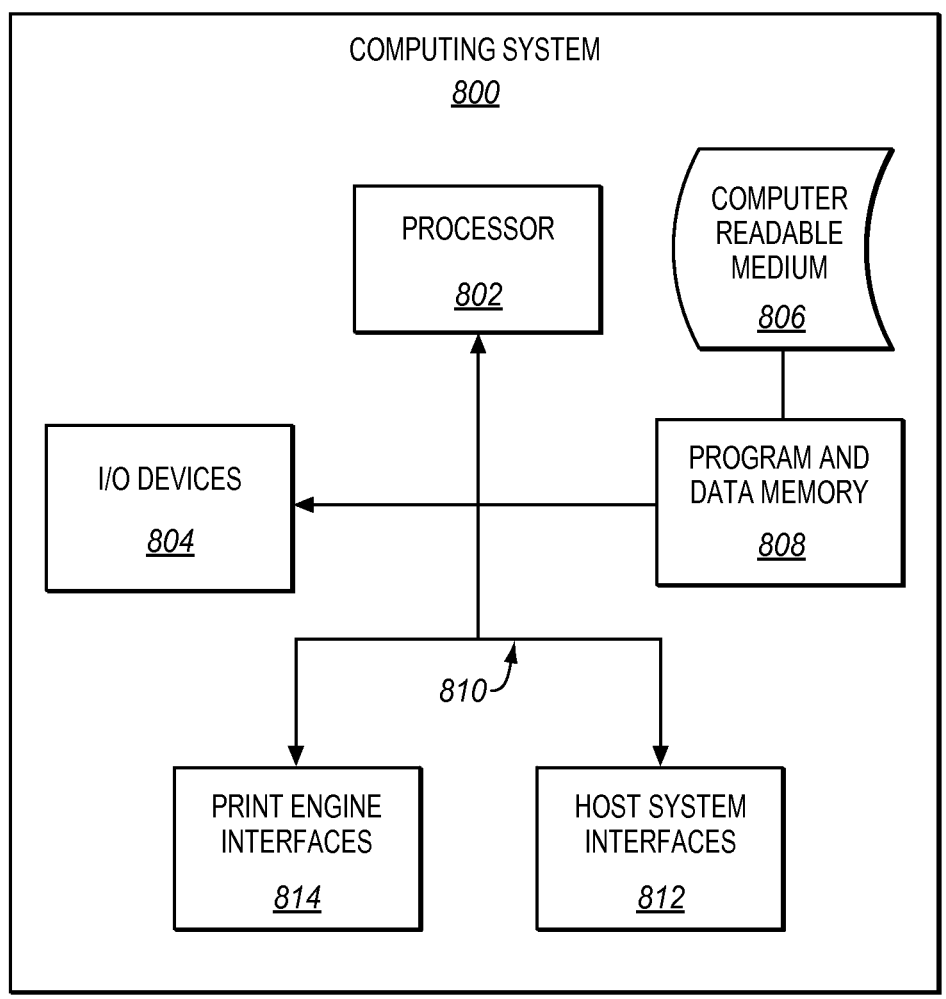
FIG. 8 illustrates a computer system operable to execute computer readable medium embodying programmed instructions to perform desired functions in an exemplary embodiment.

The invention can take the form of an entirely hardware embodiment, an entirely software embodiment or an embodiment containing both hardware and software elements. In one embodiment, the invention is implemented in software, which includes but is not limited to firmware, resident software, microcode, etc. FIG. 8 illustrates a computing system 800 in which a computer readable medium 806 may provide instructions for performing methods 300, 600, and 700 in an exemplary embodiment.

Furthermore, the invention can take the form of a computer program product accessible from a computer-usable or computer-readable medium 806 providing program code for use by or in connection with a computer or any instruction execution system. For the purposes of this description, a computer-usable or computer readable medium 806 can be any apparatus that can contain, store, communicate, propagate, or transport the program for use by or in connection with the instruction execution system, apparatus, or device.

The medium 806 can be an electronic, magnetic, optical, electromagnetic, infrared, or semiconductor system (or apparatus or device) or a propagation medium. Examples of a computer-readable medium 806 include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor 802 coupled directly or indirectly to memory 808 through a system bus 810. The memory 808 can include local memory employed during actual execution of the program code, bulk storage, and cache memories which provide temporary storage of at least some program code in order to reduce the number of times code is retrieved from bulk storage during execution.

Input/output or I/O devices 804 (including but not limited to keyboards, displays, pointing devices, etc.) can be coupled to the system either directly or through intervening I/O controllers.

Network adapters may also be coupled to the system to enable the data processing system to become coupled to other data processing systems, such a through host systems interfaces 812, or remote printers or storage devices through intervening private or public networks, such as through print engine interfaces 814. Modems, cable modem and Ethernet cards are just a few of the currently available types of network adapters.

Although specific embodiments were described herein, the scope of the invention is not limited to those specific embodiments. The scope of the invention is defined by the following claims and any equivalents thereof.

I claim:

1. A printer comprising:
a user interface operable to receive input from a user selecting a print quality parameter that modifies a print quality of the printer when printing a test image, to receive input from the user defining a range of values for the print quality parameter to utilize when printing the test image, and to receive input from the user defining a number of samples of the test image to print; and a print module operable to print the number of samples of the test image, wherein each of the number of samples of the test image is printed utilizing a different value in the range defined for the print quality parameter to allow for an analysis of the print quality of the printer by the user.

2. The printer of claim 1 wherein the print module of the printer further includes:

a print controller operable to rasterize the test image into a plurality of rasterized versions of the test image based on the range of values defined for the print quality parameter, wherein each of the rasterized versions of the test image is rasterized utilizing a different value in the range defined for the print quality parameter; and wherein the print controller is further operable to direct a print engine of the printer to print the rasterized versions of the test image as the variations of the test image.

3. The printer of claim 2 wherein the print quality parameter comprises at least one of a screen, a pel, a tone curve, a color profile, a halftone curve, a highlight, a midtone shadow, a brightness, a dot gain, and a colorant level.

4. The printer of claim 1 wherein the print module of the printer further includes:

a print controller operable to rasterize the test image into a rasterized test image; and a print engine operable to receive the rasterized test image from the print controller, and to apply a different one of the values in the range defined for the print quality parameter when printing the rasterized test image as each of the variations of the test image.

5. The printer of claim 4 wherein the print quality parameter comprises at least one of a contrast, a boldness, a preheat temperature of the print engine, a fuser temperature of the print engine, an oil rate of the print engine, and an oil belt rate of the print engine.

6. A method operable on a printer for print quality analysis, the method comprising:

selecting a print quality parameter that modifies a print quality of the printer when printing a test image;

defining a range of values for the print quality parameter to utilize when printing the test image;

defining a number of samples of the test image to print; and printing the number of samples of the test image, wherein each of the number of samples of the test image is printed utilizing a different value in the range defined for the print quality parameter to allow for an analysis of the print quality of the printer by the user.

7. The method of claim 6 wherein printing the plurality of variations further comprises:

rasterizing the test image into a plurality of rasterized versions of the test image based on the range of values defined for the print quality parameter, wherein each of the rasterized versions of the test image is rasterized utilizing a different value in the range defined for the print quality parameter; and printing the rasterized versions of the test image as the variations of the test image.

8. The method of claim 7 wherein the print quality parameter comprises at least one of a screen, a pel, a tone curve, a color profile, a halftone curve, a highlight, a midtone shadow, a brightness, a dot gain, and a colorant level.

9. The method of claim 6 wherein printing the plurality of variations further comprises:

rasterizing the test image into a rasterized test image; and applying a different one of the values in the range defined for the print quality parameter when printing the rasterized test image as each of the variations of the test image.

10. The method of claim 9 wherein the print quality parameter comprises at least one of a contrast, a boldness, a preheat temperature of a print engine of the printer, a fuser temperature of the print engine, an oil rate of the print engine, and an oil belt rate of the print engine.

11. A non-transitory computer readable medium tangibly embodying programmed instructions which, when executed by computing system of a printer, are operable for performing a method on the printer for print quality analysis, the method comprising:

selecting a print quality parameter that modifies a print quality of the printer when printing a test image;

defining a range of values for the print quality parameter to utilize when printing the test image;

defining a number of samples of the test image to print; and printing the number of samples of the test image, wherein each of the number of samples of the test image is printed utilizing a different value in the range defined for the print quality parameter to allow for an analysis of the print quality of the printer by the user.

12. The non-transitory computer readable medium of claim 11 wherein printing the plurality of variations further comprises:

rasterizing the test image into a plurality of rasterized versions of the test image based on the range of values defined for the print quality parameter, wherein each of the rasterized versions of the test image is rasterized utilizing a different value in the range defined for the print quality parameter; and printing the rasterized versions as the variations of the test image.

13. The non-transitory computer readable medium of claim 12 wherein the print quality parameter comprises at least one of a screen, a pel, a tone curve, a color profile, a halftone curve, a highlight, a midtone shadow, a brightness, a dot gain, and a colorant level.

14. The non-transitory computer readable medium of claim 11 wherein printing the plurality of variations further comprises:

rasterizing the test image into a rasterized test image; and applying a different one of the values in the range defined for the print quality parameter when printing the rasterized test image as each of the variations of the test image.

15. The non-transitory computer readable medium of claim 14 wherein the print quality parameter comprises at least one of a contrast, a boldness, a preheat temperature of a print engine of the printer, a fuser temperature of the print engine, an oil rate of the print engine, and an oil belt rate of the print engine utilized when printing the variations of the test image.

* * * * *